(12) United States Patent
Khayrallah (10) Patent No.: US 8,743,942 B2
(45) Date of Patent: *Jun. 3, 2014

(54) DEMODULATION USING SERIAL LOCALIZATION WITH INDECISION

(71) Applicant: Telefonaktiebolaget L M Ericsson (PUBL), Stockholm (SE)

(72) Inventor: Ali S. Khayrallah, Mountain View, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/644,602

(22) Filed: Oct. 4, 2012

(65) Prior Publication Data

US 2013/0028355 A1 Jan. 31, 2013

Related U.S. Application Data (63) Continuation of application No. 12/549,132, filed on Aug. 27, 2009, now Pat. No. 8,306,102.

(51) Int. Cl.
*H04L 27/01* (2006.01)

(52) U.S. Cl.
USPC ........................................ 375/232; 375/341

(58) Field of Classification Search
USPC ......... 375/232, 229, 230, 350, 262, 340, 341, 375/320
See application file for complete search history.

(56) References Cited

U.S. PATENT DOCUMENTS

| | | |
|---|---|---|
| 2003/0063596 A1 | 4/2003 | Arslan et al. |
| 2003/0063663 A1 * | 4/2003 | Bryant .................. 375/229 |
| 2004/0052317 A1 | 3/2004 | Love et al. |
| 2005/0243943 A1 | 11/2005 | Stirling-Gallacher |
| 2006/0146950 A1 | 7/2006 | Hoo |
| 2006/0251181 A1 | 11/2006 | Shashidhar et al. |
| 2007/0291882 A1 | 12/2007 | Park et al. |
| 2008/0198952 A1 | 8/2008 | Stirling-Gallacher |
| 2008/0310556 A1 | 12/2008 | Lee et al. |

(Continued)

FOREIGN PATENT DOCUMENTS

EP 1 703 686 A1 9/2006

OTHER PUBLICATIONS

Qingmin Meng et al. "Combined transmit antenna selection and detection over spatial correlated MIMO systems", Journal of Electronics (China), Nov. 2007, whole document.

(Continued)

*Primary Examiner* — Aristocratis Fotakis (57) ABSTRACT

A receiver includes a constellation processing module and a plurality of demodulation stages. The constellation processing module groups points of a constellation associated with a transmitted signal into a plurality of subsets, were at least two adjacent ones of the subsets have one or more common constellation points so that the at least two adjacent subsets overlap. The constellation processing module also determines a centroid-based value for each of the subsets of constellation points and groups the centroid-based values into one or more sets. Each of the demodulation stages except for the last demodulation stage localizes a search for a final symbol decision using the set of centroid-based values input to or selected by the demodulation stage as constellation points. The last demodulation stage determines the final symbol decision using the subset of constellation points input to or selected by the last demodulation stage.

13 Claims, 9 Drawing Sheets

(56) References Cited

U.S. PATENT DOCUMENTS

| | | |
|---|---|---|
| 2009/0323795 A1 | 12/2009 | Stirling-Gallacher |
| 2010/0142649 A1 | 6/2010 | Xie et al. |
| 2010/0150258 A1 | 6/2010 | van Zelst |
| 2012/0155579 A1 | 6/2012 | Zilberman et al. |

OTHER PUBLICATIONS

Meng Q.et al., "Transmit Antenna Selection in Spatial Correlated MIMO Systems with Correlation-Adapted Iterative Receiver", Southeast University, Nanjing, China and Motorola, 2006 IEEE, the whole document.

Meng Q.et al., "Transmit Antenna Selection in Spatial Correlated MIMO Systems with Correlation—Adapted Iterative Receiver", Southeast University, Nanjing, China and Motorola, 2006 IEEE, the whole document.

Li X. et al., "Reduced-complexity detection algorithms for systems using multi-element arrays", Lucent Technologies, Bell Labs, 2000 IEEE, the whole document.

Gupta A.S. et al. "Multi-stage Detection Using Constellation Structure", University of Illinois at Urbana-Champaign, IEEE, Nov. 2006, the whole document.

* cited by examiner

DEMODULATION USING SERIAL LOCALIZATION WITH INDECISION

CROSS-REFERENCE TO RELATED APPLICATION

This application is a continuation of patent application Ser. No. 12/549,132, filed on Aug. 27, 2009, which is incorporated by reference herein in its entirety.

TECHNICAL FIELD

The present invention generally relates to demodulation, and more particularly relates to demodulation based on serial localization with indecision.

BACKGROUND

Demodulation involves extracting an original information-bearing signal from a signal which is modulated in accordance with a particular constellation and transmitted over a channel. The complexity of the demodulation process increases significantly for very large signal constellations. Relatively large signal constellations such as 16-, 32- and 64-QAM (Quadrature Amplitude Modulation) have been adopted in EDGE (Enhanced Data Rates for GSM Evolution), HSPA (High Speed Packet Access), LTE (Long Term Evolution) and WiMax (Worldwide Interoperability for Microwave Access). In HSPA, multi-code transmission creates even larger effective constellations. Also, MIMO (Multiple-Input, Multiple-Output) schemes with two or more streams have been adopted in HSPA, LTE and WiMax. MIMO implementations also yield relatively large effective constellations. Demodulation complexity further increases when any of these techniques occur in combination, e.g. multi-code and MIMO.

The ideal demodulation scheme is MLD (Maximum Likelihood Detection). However, the complexity of MLD increases substantially due to the size of the modulation constellation and/or because of the exponential effects of MIMO or multi-codes to the point where MLD becomes impractical. Less complex solutions are available such as sphere decoding (SD), where the demodulator tries to approximate the performance of MLD, but limits its search for the best solution to a subset of all possible transmitted signals, and where the subset is described by a sphere. A key step in SD is the triangular factorization of the channel matrix. This step simplifies the identification of candidate solutions in the sphere.

Another conventional demodulation technique is ITS (Iterative Tree Search) detection for MIMO QAM. ITS can be viewed as an alternative to SD. Like SD, ITS exploits the triangular factorization of the channel. Unlike SD, ITS uses the M-algorithm for reducing the search for the best candidate. ITS breaks down the search further, by dividing the QAM constellation in its four quadrants, and representing each quadrant by its centroid in intermediate computations. The selected quadrant itself is subdivided again into its 4 quadrants, and so on. This results in a quaternary tree search. Other conventional approaches give particular attention to the additional error introduced by the use of the centroids instead of true symbols. The error is modeled as Gaussian noise whose variance is determined and incorporated in likelihood computations. However, a tight connection is typically made between the centroid representation and the bit mapping from bits to symbols. That is, if a so-called multi-level bit mapping is employed, then identifying a quadrant is equivalent to making a decision on a certain pair of bits. Such constraints place a restriction on bit mappings, restricting the design of subsets.

SUMMARY

Demodulation is performed in a series of stages. Each stage attempts to further localize the search for a solution for the benefit of the next stage, based on input from the previous stage. The demodulator structure is referred to herein as serial localization with indecision (SLI). SLI is a lower complexity alternative to MLD, where MLD coincides with joint demodulation (JD) for MIMO environments. Viewed in isolation, a given SLI demodulation stage can be quite indecisive, but makes progress and avoids an irreversible wrong decision. A given demodulation stage localizes the solution by inputting a subset representative of the constellation and outputting a further reduced subset. Each stage makes a choice among candidate reduced subsets. Indecision arises from representing the modulation constellation with overlapping subsets. Indecision is beneficial in a multi-stage structure, because indecision discourages an irreversible bad decision in an early stage.

According to an embodiment of a method for demodulating a received signal corresponding to a transmitted signal carried over a channel, the method includes grouping points of a constellation associated with the transmitted signal into a plurality of subsets, at least two adjacent ones of the subsets having one or more common constellation points so that the at least two adjacent subsets overlap. A centroid-based value is determined for each of the subsets of constellation points and the centroid-based values are grouped into one or more sets for input to a demodulator having a plurality of stages. The received signal is demodulated using the demodulator. Each of the stages except for a last one of the stages localizes a search for a final symbol decision using the set of centroid-based values input to or selected by the stage as constellation points. The last stage determines the final symbol decision using one of the subsets of constellation points input to or selected by the last stage.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
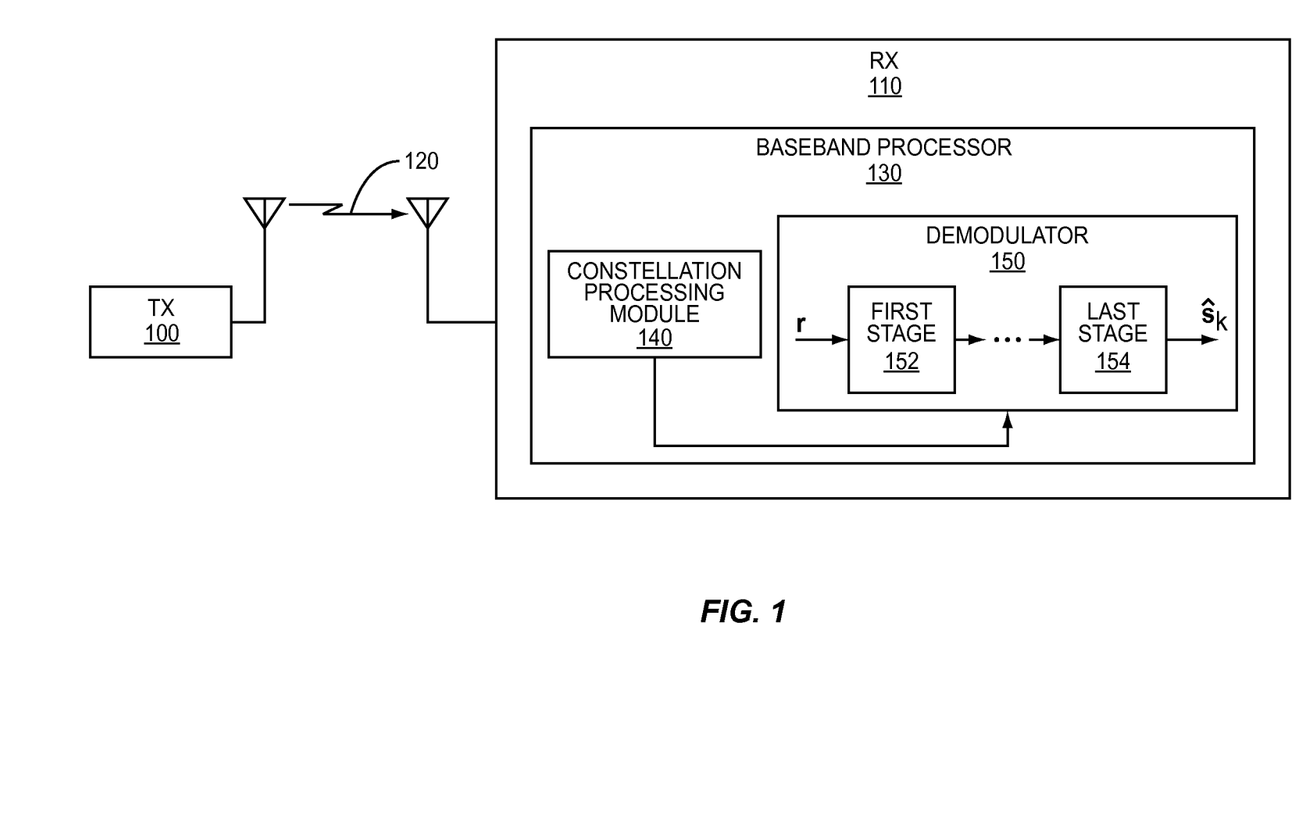
FIG. 1 illustrates a block diagram of an embodiment of a receiver including a multi-stage SLI demodulator and a constellation processing module.

FIG. 1 illustrates an embodiment of a wireless transmitter 100 in communication with a wireless receiver 110 over a channel 120. The receiver includes a baseband processor 130 and a constellation processing module 140 and a multi-stage SLI demodulator 150 included in or associated with the baseband processor 130. The constellation processing module 140 groups points of a constellation associated with a transmitted signal into a plurality of subsets, e.g., subsets of ASK constellation points, QAM constellation points, etc. At least two adjacent subsets have one or more common constellation points to ensure that these adjacent subsets overlap. In some embodiments, all adjacent subsets have one or more common constellation points to ensure that all adjacent subsets overlap. In each case, the constellation processing module 140 also determines a centroid-based value for each of the subsets of constellation points and groups the centroid-based values into one or more sets. The values included in each set are centroid-based in that they may be actual centroids, approximations of centroids such as integer values or values quantized to a certain finite precision, the closest constellation point to a centroid, etc. More generally, each subset is assigned a centroid-based representative, which we call a centroid from here on.

The multi-stage SLI demodulator 150 includes a plurality of stages 152, 154 for performing signal demodulation in stages. Each of the demodulation stages 152 except for the last stage 154 localizes the search for a final symbol decision using the set of centroid-based values input to or selected by the stage 152 as constellation points. The last demodulation stage 154 determines the final symbol decision using a subset of the initial constellation points. This way, each of the demodulation stages 152 except for the last stage 154 further localizes the search for a solution using a set of the centroid-based values as constellation points, reducing the overall complexity of the demodulator. The last stage 154 outputs the final solution based on a subset of the actual constellation. The constellation processing module 140 ensures that at least two adjacent subsets of constellation points overlap to reduce the likelihood of demodulation errors, particularly for the earlier demodulation stages as will be described in more detail later herein.

Figure 2:
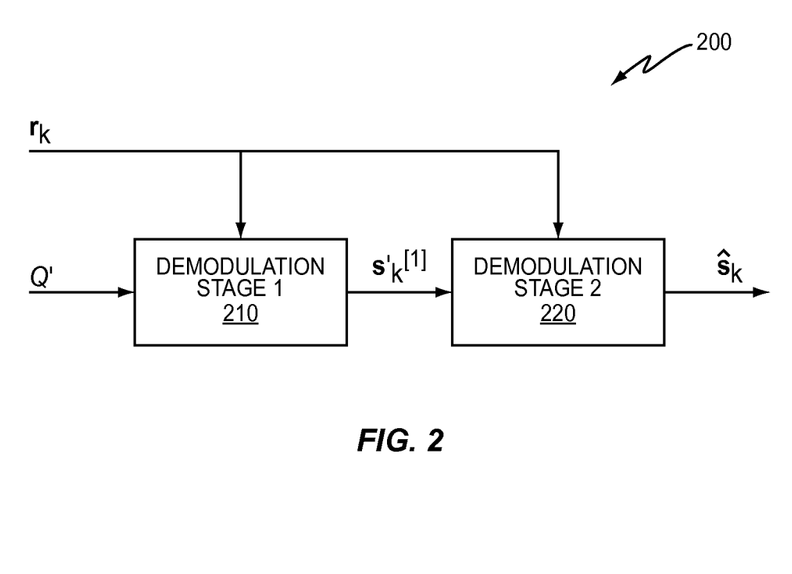
FIG. 2 illustrates a block diagram of an embodiment of a two-stage SLI demodulator.

FIG. 2 illustrates an embodiment of a 2-stage SLI demodulation structure 200 included in the receiver 110 of FIG. 1 for demodulating a received signal $r_k$. The received signal $r_k$ is carried over the channel 120 and originally modulated at the transmitter 100 using symbol constellation Q. For purely illustrative purposes only, signal $r_k$ in a single input single output (SISO) scenario of a signal transmission embodiment over a noisy channel with no ISI (Inter-Symbol Interference) is given by:

$$r_k = H_0 s_k + v_k \quad (1)$$

where $v_k$ represents white Gaussian noise, $H_0$ represents the channel 120, $s_k$ represents the transmitted symbols and all quantities are scalar. One skilled in the art can readily expand the signal model represented by equation (1) to other scenarios such as MIMO and multi-coded transmission, where the quantities in equation (1) become vectors and matrices.

The originally transmitted signal has symbol constellation Q of size q. The constellation processing module 140 of the receiver 110 groups the points of constellation Q into a plurality of subsets in a way that ensures at least two adjacent subsets overlap. The constellation processing module 140 also determines a centroid-based value for each of the subsets of constellation points and generates an alternative constellation Q' including the centroid-based values, not necessarily belonging to Q, for input to a first stage 210 of the 2-stage SLI demodulation structure 200.

The first stage 210 of the SLI structure 200 performs demodulation using the alternative constellation Q'. That is, the first demodulation stage 210 uses the centroid-based values included in Q' as constellation points. Each point in Q' represents a subset of clustered points in Q. In one embodiment, each centroid-based value included in Q' is the actual centroid for the points of a particular subset of Q. In another embodiment, the centroids are approximated as integer values. In yet another embodiment, each centroid-based value included in Q' is the constellation point of Q located closest to the corresponding centroid value. Still other types of values may be used which are derived based on the centroids determined from the different subsets of Q.

The first demodulation stage 210 outputs a symbol decision $s'^{[1]}_k$, which belongs to Q'. The second demodulation stage 220 accepts $s'^{[1]}_k$ and uses $s'^{[1]}_k$ to choose a localized subset Q'' of Q as its own constellation. The decision $s'^{[1]}_k$ output by the first demodulation stage 210 can be interpreted to be the representative of Q'' in the first demodulation stage 210. The second demodulation stage 220 outputs the final symbol decision $\hat{s}_k$, which belongs to Q''. The final symbol decision $\hat{s}_k$ output by the second stage 220 is determined based on the original received signal $r_k$ and subset Q'', which is selected based on the localized symbol decision $s'^{[1]}_k$ output by the first stage 210. In one embodiment, both demodulation stages 210, 220 implement MLD over their respective alphabets. Alternatively, the demodulation stages 210, 220 implement other types of demodulation schemes such as joint detection, sphere decoding, tree searching, etc. The 2-stage SLI demodulation structure 200 makes q'=|Q'| comparisons in the first stage 210 and q''=|Q''| comparisons in the second stage 220. Complexity of the SLI structure 200 is reduced when q'+q''<q. Also, SLI has constant complexity, unlike many suboptimal techniques whose complexity is a random variable.

SLI can mimic the behavior of MLD. The performance of the 2-stage SLI structure 200 of FIG. 2 is primarily limited by that of the first demodulation stage 210, which in turn is determined by the choice of subsets. Performance suffers when no adjacent subsets overlap. Consider the case of disjoint subsets. MLD implicitly defines a decision region (Voronoi region) around each constellation point, consisting of received values closest to that point than any other. The decision region boundaries are polyhedrons (made up of sections of hyperplanes). Two constellation points x and y are neighbors if their decision regions touch. The common part is a section of the hyperplane P(x,y) that bisects the space according to x and y. In degenerate cases, the common part can become a line or a point. Now consider two adjacent subsets X and Y of Q which are available to the first demodulator stage 210 of the two-stage SLI structure 200. Subsets X and Y have centroids c(X) and c(Y), respectively. Consider neighbor pair (x,y), where x belongs to X and y belongs to Y. Suppose x is transmitted, and the first demodulation stage 210 makes an error and chooses subset Y instead of subset X. The effective decision boundary of the first demodulation stage 210 is the hyperplane P(c(X),c(Y)). In contrast, MLD would make the choice based on P(x,y). For the sake of comparison, MLD can be thought of as making an effective decision between X and Y. Then the effective decision boundary is made up of the sections P(x,y) of different nearest neighbor pairs (x,y).

Figure 3:
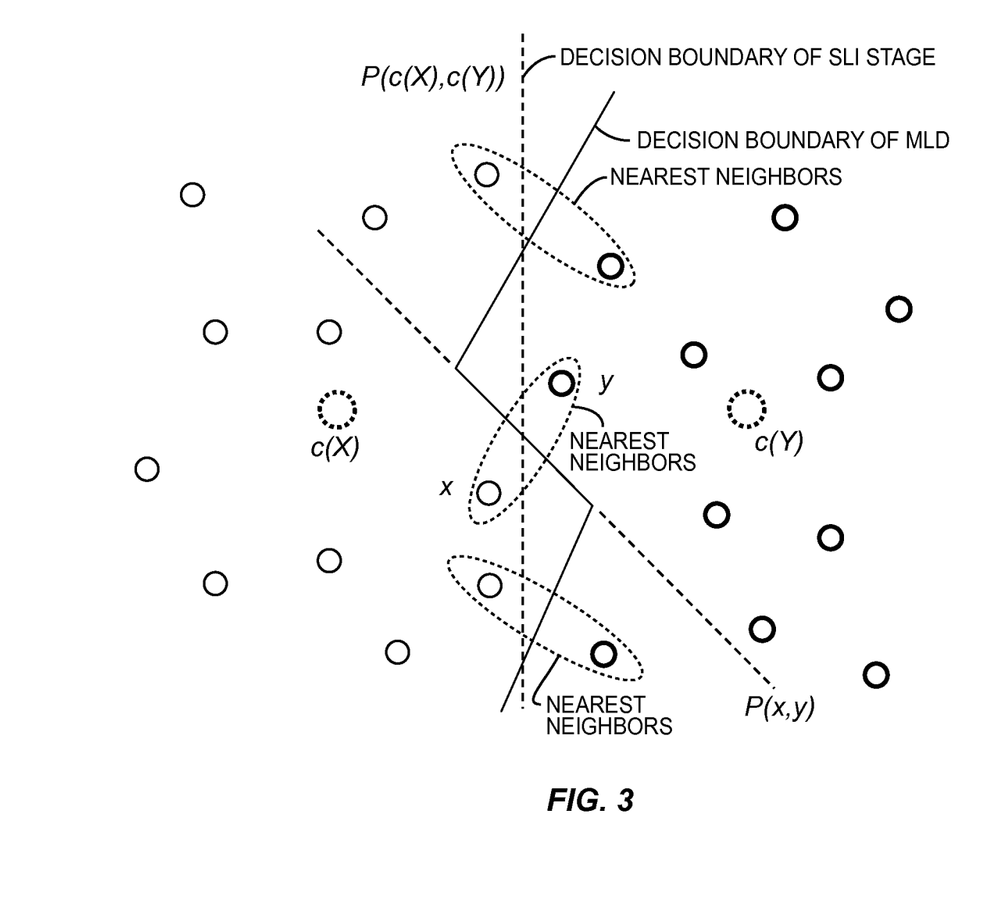
FIG. 3 illustrates a diagram of an embodiment of overlapping constellation subsets for use by a multi-stage SLI demodulator.

FIG. 3 illustrates the effective decision boundary between adjacent subsets X and Y in two dimensions, where the hyperplane becomes a straight line and each constellation point is represented by a circle. In contrast, the decision boundary for MLD is a piecewise straight jagged line. The discrepancy between these hypothetical decision boundaries leads to a performance loss in SLI.

Overlapping two or more adjacent subsets smoothes the decision boundary discrepancy. In particular, in the two stage SLI, including nearest neighbor symbols pairs in the overlap of adjacent subsets of the first demodulation stage means that the first demodulation stage does not have to make a decision about those symbols. That decision will be made in the second stage.

With SLI, the search is further localized from one stage to the next, but the final decision is not made until the last stage. In particular, by making nearest neighbor symbols belong to multiple subsets, a later demodulation stage (e.g. the second stage 220 in FIG. 2) may recover from an error in an earlier stage (e.g. the first stage 210 in FIG. 2). In this context, indecision is beneficial. However, ensuring adjacent subsets overlap has a cost. In terms of complexity, q' or q", or both, will increase for the overlap case in comparison to the disjoint case.

Figure 4:
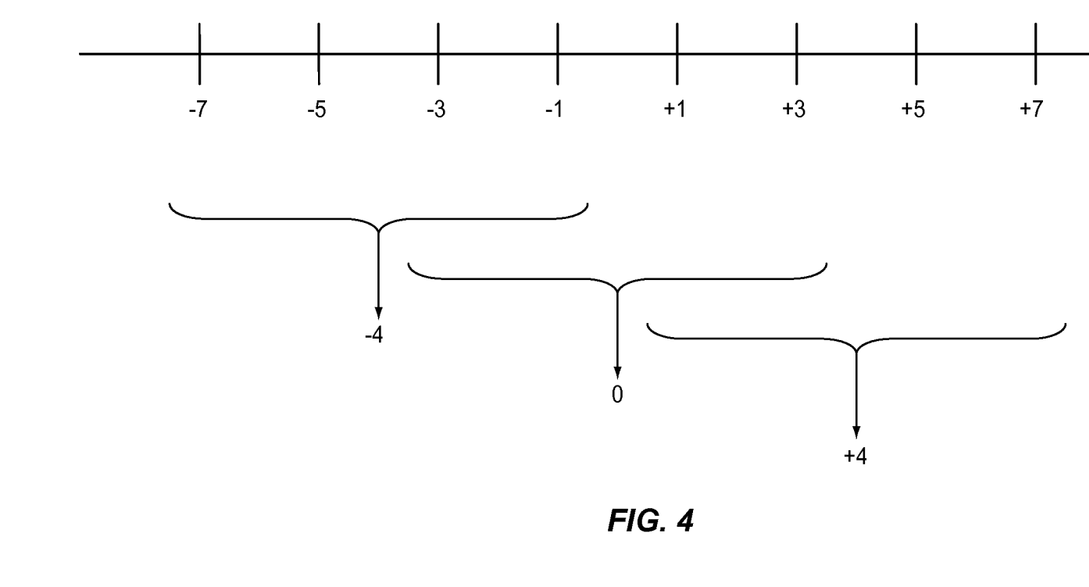
FIG. 4 illustrates a diagram of an embodiment of overlapping ASK constellation subsets for use by a multi-stage SLI demodulator.

FIG. 4 illustrates an exemplary embodiment of an 8-ASK constellation grouped into three subsets. The 8-ASK constellation is given by:

$$Q=\{-7,-5,-3,-1,+1,+3,+5,+7\} \quad (2)$$

The three overlapping subsets shown in FIG. 4 have centroids given by:

$$Q'=\{-4,0,+4\} \quad (3)$$

The overlap means that the second demodulation stage 220 of the SLI structure 200 of FIG. 2 can often recover from a bad decision by the first demodulation stage 210. The two outer subsets shown in FIG. 4 are offsets of one another, and the offset is equal to the centroid difference. SLI complexity can be further reduced by accounting for the highly structured nature of these subsets. Of course, less structured subsets can also be used with SLI.

Figure 5:
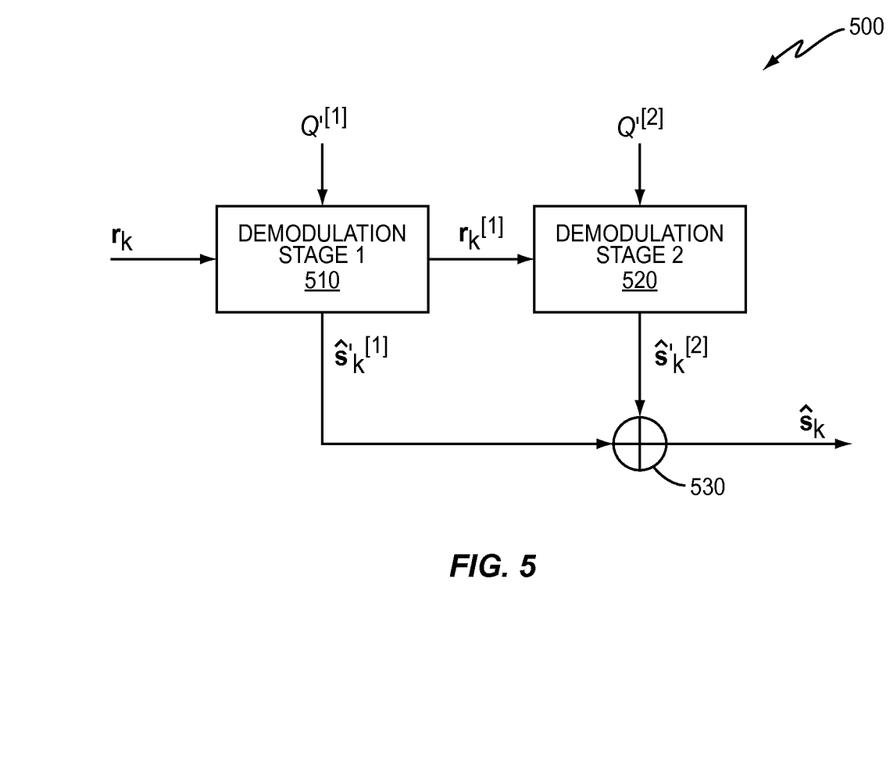
FIG. 5 illustrates a block diagram of another embodiment of a two-stage SLI demodulator.

FIG. 5 illustrates another embodiment of a 2-stage SLI demodulation structure 500 for demodulating signal $r_k$. The 2-stage SLI structure 500 shown in FIG. 5 is similar to the one shown in FIG. 2, except it is tailored to the highly structured nature of the ASK constellation subsets shown in FIG. 4. The constellation input to or selected by the first demodulation stage 510 is the set of centroids denoted $Q'^{[1]}$. The first modulation stage 510 outputs a decision $\hat{s}'_k{}^{[1]}$ which is the centroid-based value included in $Q'^{[1]}$ that most closely corresponds to the signal $r_k$. The first demodulation stage 510 also generates a re-modulated signal $\hat{r}'_k{}^{[1]}$ as a function of $\hat{s}'_k{}^{[1]}$ and the channel 120 over which the signal is carried as given by:

$$\hat{r}'_k{}^{[1]} = H_0 \hat{s}'_k{}^{[1]} \quad (4)$$

where $H_0$ represents the channel 120.

The first demodulation stage 510 removes the re-modulated signal $\hat{r}'_k{}^{[1]}$ from $r_k$ to generate a modified signal $r_k{}^{[1]}$ for input to the second stage 520 as given by:

$$r_k{}^{[1]} = r_k - \hat{r}'_k{}^{[1]} \quad (5)$$

The modified signal $r_k{}^{[1]}$ is then fed to the second demodulation stage 520 instead of the original signal $r_k$. The second demodulation stage 520 determines the final symbol decision $\hat{s}_k$ by demodulating $r_k{}^{[1]}$ output by the first stage 510 using subset $Q'^{[2]}$ of constellation points input to or selected by the last stage 520 to generate a localized symbol decision $\hat{s}'_k{}^{[2]}$ associated with the second stage 520. A summer 530 included in or associated with the second demodulation stage 520 sums $\hat{s}'_k{}^{[1]}$ and $\hat{s}'_k{}^{[2]}$ to generate the final symbol decision $\hat{s}_k$ as given by:

$$\hat{s}_k = \hat{s}'_k{}^{[1]} + \hat{s}'_k{}^{[2]} \quad (6)$$

To account for change to the input of the second demodulation stage 520, constellation $Q'^{[2]}$ is the subset of Q centered so its centroid is equal to 0. With regard to the subset embodiment shown in FIG. 4, $Q'^{[2]}$ is the middle subset. The decision $s'_k{}^{[2]}$ output by the second demodulation stage 520 is an element of $Q'^{[2]}$. Considering again an exemplary 8-ASK constellation embodiment, $Q'^{[1]}=\{-4,0,+4\}$ and $Q'^{[2]}=\{-3,-1,+1,+3\}$. The second subset $Q'^{[2]}$ corresponds to the 4-ASK constellation. This SLI embodiment is referred to herein as SL34. The corresponding number of comparisons is 3 and 4, for a total of 7 compared to 8 for MLD. The computational efficiency SLI has over MLD increases substantially for MIMO and multi-code transmission scenarios.

An L×L MIMO embodiment is described next, where a plurality of signal components are transmitted from multiple antennas and received from multiple antennas. The number of transmit and receive antennas are both assumed to be equal to L. Those skilled in the art will recognize that the number of receive antennas may in fact be smaller or larger than the number of transmit antennas. Now $r_k$, $s_k$ and $v_k$ in equation (1) are L×1 vectors and $H_0$ is an L×L matrix. For ease of explanation only and without much loss of generality, the same constellation is presumed to be used for all L transmitted signals. However, those skilled in the art will recognize that the embodiments described next can be readily expanded to cover the scenario where some or all of the L transmitted signals have different constellations. The effective constellation at the receiver has points given by $H_0 \hat{s}_k$ and size q. Unlike the SISO case, where the channel 120 applied a trivial scaling and rotation to the constellation, here the effective constellation gets distorted by $H_0$. In principle, overlapping subsets can be designed for the effective constellation. However, the effective constellation changes with the channel 120, and thus so would the design of the overlapping subsets. In another embodiment, the subsets can be designed on a signal component basis. According to this embodiment, the discrepancy between the MLD and SLI decision boundaries can be big enough to affect performance of the SLI when the effective constellation is distorted significantly. However, this embodiment still proves to be very resilient.

Again turning to the exemplary 8-ASK constellation, the 8-ASK constellation is applied to 2×2 MIMO in an embodiment, where each signal component constellation is 8-ASK. For the 2-stage SLI structure 500 shown in FIG. 5, the three overlapping subsets shown in FIG. 4 are used for each signal component constellation. According to the SL34 embodiment, the first demodulation stage 510 compares 3×3=9 candidates and the second demodulation stage 520 compares 4×4=16 candidates, for an SLI total of 25. In contrast, MLD compares 8×8=64 candidates. In an alternate embodiment, the set of centroid-based values input to the first demodulation stage 510 includes four values and is given by $Q'^{[1]}=\{-5,-1,+1,+5\}$. The subset points input to the second demodulation stage 520 includes three ASK localized constellation points given by $Q'^{[2]}=\{-2,0,+2\}$. This SLI embodiment is referred to herein as SL43. In yet another embodiment referred to herein as SL25, $Q'^{[1]}=\{-3,+3\}$ and $Q'^{[2]}=\{-4,-2, 0,+2,+4\}$. In each case, the subsets overlap to reduce the likelihood of errors caused by the 2-stage SLI structures described herein. The 2-stage SLI embodiments described herein can be readily extended to any number of desired stages.

Figure 6:
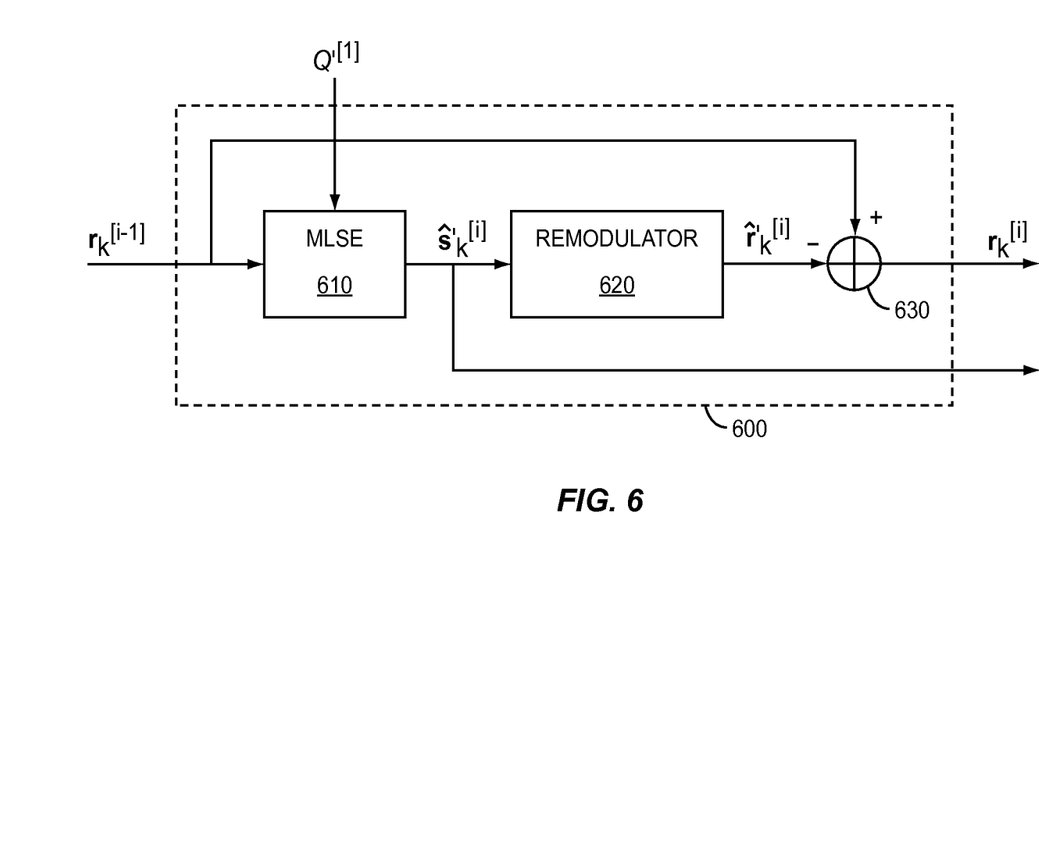
FIG. 6 illustrates a block diagram of an embodiment of an i-th stage of a multi-stage SLI demodulator.

FIG. 6 illustrates an embodiment of the i-th stage 600 of an SLI demodulator structure where i<N. The input to the i-th demodulation stage 600 is the modified received signal $r_k^{[i-1]}$ output by the immediately preceding stage (not shown in FIG. 6). The constellation $Q'^{[i]}$ input to the i-th stage 600 includes a set of centroid-based values determined as previously described herein. A MLD component 610 of the i-th stage 600 outputs symbols $\hat{s}'_k{}^{[i]}$ based on $Q'^{[i]}$ and $r_k^{[i-1]}$. A re-modulator component 620 of the i-th stage 600 generates a re-modulated signal $\hat{r}'_k{}^{[i]} = H_0 \hat{s}'_k{}^{[i]}$. A signal subtractor component 630 of the i-th stage 600 subtracts $\hat{r}'_k{}^{[i]}$ from $r_k^{[i-1]}$ to yield a modified received signal $r_k^{[i]}$, which is fed to the next stage (not shown in FIG. 6).

Figure 7:
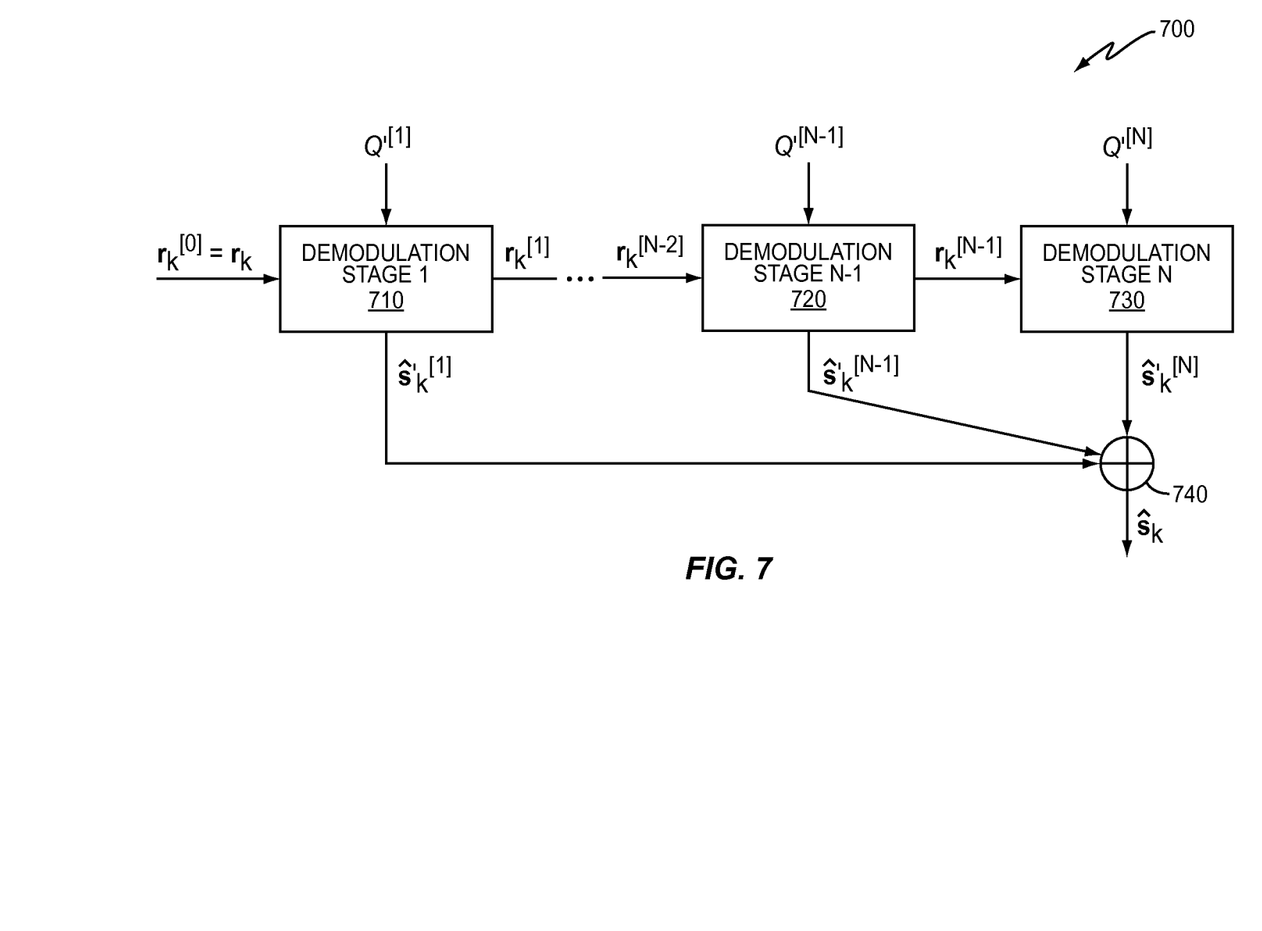
FIG. 7 illustrates a block diagram of an embodiment of an N-stage SLI demodulator.

FIG. 7 illustrates an embodiment of an N-stage SLI demodulation structure 700. The input to the first stage 710 is the original received signal $r_k^{[0]}=r_k$. For the last stage 730, the constellation $Q'^{[N]}$ is a subset of Q. There is no need for re-modulation block in the last stage 730. A summer component 740 included in or associated with the last stage 730 determines the overall final symbol decision by adding all intermediate symbol decisions as given by:

$$\hat{s}_k = \hat{s}'_k{}^{[1]} + \ldots + \hat{s}'_k{}^{[N]} \quad (7)$$

In one embodiment, each intermediary stage 720 of the N-stage SLI demodulator 700 has the same structure as the i-th demodulation stage 600 shown in FIG. 6. According to this embodiment, the i-th intermediary stage 720 localizes the search for the final symbol decision $\hat{s}_k$ by demodulating a modified version of the received signal $r_k^{[i-1]}$ output by the immediately preceding stage using the set of centroid-based values $Q'^{[i]}$ input to or selected by the i-th intermediary stage 720 and outputting a localized symbol decision $\hat{s}'_k{}^{[i]}$ as described previously herein.

The i-th intermediary stage 720 also generates a re-modulated signal $\hat{r}'_k{}^{[i]}$ as a function of the channel 120 and the localized symbol decision generated by the stage 720. The re-modulated signal $\hat{r}'_k{}^{[i]}$ is removed from the modified version of the received signal $r_k^{[i-1]}$ output by the immediately preceding stage, e.g. as shown in FIG. 6, to generate a newly modified version of the received signal $r_k^{[i]}$ for input to the stage immediately following the i-th intermediary stage 720. Subtracting $\hat{r}'_k{}^{[i]}$ removes part of the transmitted signal, which acts as self-interference. This enables later stages to operate with less self-interference. The constellation $Q'^{[i]}$ input to or selected by each of the i intermediary stages 720 includes centroid-based values, which may or may not belong to Q, whereas the constellation $Q'^{[N]}$ input to or selected by the last stage 730 is a subset of Q. As such, the last stage 730 of the N-stage SLI demodulation structure 700 functions as an MLD on what is left from the original signal in $r_k^{[N-1]}$.

Broadly, there is no restriction on how the overlapping subsets used for SLI are defined. Subset size can vary, the number of available subsets can change from stage to stage, etc. For the case of ASK, overlapping subsets can be defined in a way that yields a nested structure and a three subset representation. Consider the general case of $2^L$ ASK, having the constellation given by:

$$Q=\{2^L+1, \ldots, -1, +1, \ldots, +2^L-1\} \quad (8)$$

Three overlapping subsets are defined, where the first subset contains the $2^{L-1}$ negative points. The second includes the $2^{L-1}$ middle points $\{2^{L-1}+1, \ldots, +2^{L-1}-1\}$, corresponding to $2^{L-1}$ ASK. The third subset includes the $2^{L-1}$ positive points. The centroids for each of the three subsets are $-2^{L-1}$, 0 and $+2^{L-1}$, respectively. The same technique can be used to generate three overlapping subsets for $2^{L-1}$ ASK, and so on. An N-stage SLI demodulation structure can then be designed using these subsets with N≤L. Except for the last stage of the N-stage SLI demodulator, the set of centroids input to or selected by the i-th stage is given by:

$$Q'^{[i]}=\{-2^{N-1}, 0, +2^{N-1}\} \quad (9)$$

The last stage of the N-stage SLI demodulator has the constellation of $2^{L-N+1}$ ASK. In particular, for N=L-1, $Q'^{[N]}=\{-3,-1,+1,+3\}$. If the maximum number of stages N=L is used, then $Q'^{[N]}=\{-1,+1\}$. Again considering 8ASK, the SL34 structure satisfies the nested subset design. Alternatively, a 3-stage SLI demodulator structure with the nested subset design can also be employed where the first and second demodulator stages each compares 9 candidates, and the third (last) demodulator stage compares 4 candidates, for a total of 21, which is slightly less than 25 for the SL34 structure.

The SLI embodiments described herein can be readily adapted to other modulation schemes such as QAM. The extension of SLI from ASK to QAM is straightforward. Again, in principle, there is no restriction on how the overlapping subsets are defined. In one embodiment, the nested subset design of $2^L$-ASK can be generalized to $2^{2L}$-QAM. Just as QAM can be viewed as taking the product of two ASK constellations to produce the complex QAM constellation, the product of the ASK subsets can be taken to produce the subsets of QAM.

Figure 8:
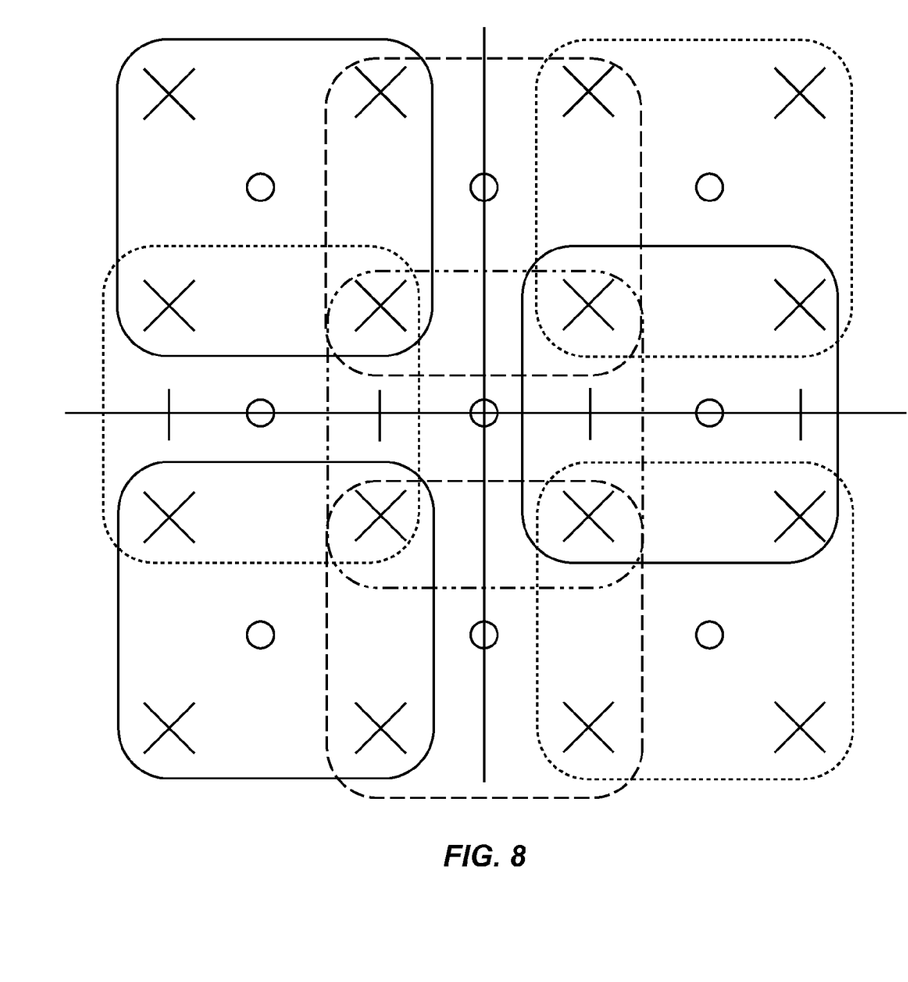
FIG. 8 illustrates a diagram of an embodiment of overlapping QAM constellation subsets for use by a multi-stage SLI demodulator.

FIG. 8 illustrates an embodiment of generalizing ASK to 16-QAM. Each QAM constellation point shown in FIG. 8 is represented by an 'X'. The three subsets for ASK, e.g. as shown in FIG. 4, yield nine subsets for 16-QAM as illustrated by the boxes drawn around the different groups of constellation points in FIG. 8. At least two adjacent subsets have overlapping constellation points. The middle subset coincides with 4-QAM, or QPSK (Quadrature Phase-Shift Keying). The nine centroid values for 16-QAM, which are shown as circles in FIG. 8, are also determined from the respective three centroid values for ASK. ASK can be further generalized to 64-QAM. For the SL34 embodiment and 64-QAM, the first demodulation stage compares 9×9=81 candidates and the second demodulator stage compares 16×16=256 candidates, for a total of 337. In contrast, MLD compares 64×64=4096 candidates for 64-QAM. Thus, the reduced-complexity advantage of SLI becomes more pronounced as the constellation grows.

Figure 9:
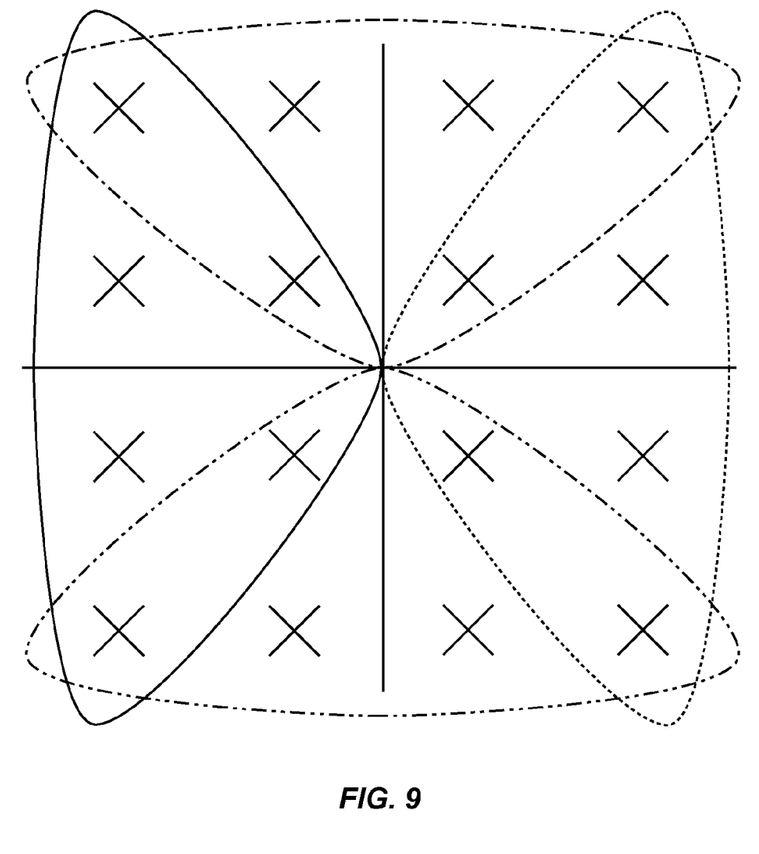
FIG. 9 illustrates a diagram of another embodiment of overlapping QAM constellation subsets for use by a multi-stage SLI demodulator.

The design of overlapping subsets need not be based on the component ASK constellation. FIG. 9 illustrates an embodiment of the 16-QAM constellation where each of the subsets is directly determined from the QAM constellation and not derived from ASK. Each QAM constellation point shown in FIG. 9 is represented by an 'X' and the subsets are shown as boxes drawn around different groups of constellation points. Again, at least two adjacent subsets have overlapping constellation points. Each of the SLI embodiments described herein, including subset selection, yield a low complexity alternative to MLD with good performance. SLI provides a distinct complexity advantage as the effective modulation constellation grows, such as in MIMO and multi-code scenarios.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A method of demodulating a received signal corresponding to a transmitted signal carried over a channel, comprising:
grouping points of a constellation associated with the transmitted signal into a plurality of subsets, adjacent ones of the subsets having one or more common constellation points so that at least two adjacent subsets overlap;
determining a centroid-based value for each of the subsets of constellation points;
grouping the centroid-based values into one or more sets for input to a demodulator having a plurality of stages wherein a first one of the stages localizes a search for a final symbol decision; and demodulating the received signal using the demodulator, each of the stages except for a last one of the stages localizing the search for the final symbol decision using the set of centroid-based values input to or selected by the stage as constellation points to generate a localized symbol decision and the last stage generates a last one of localized symbol decisions for determining the final symbol decision using one of the subsets of constellation points input to or selected by the last stage; and
summing each of the localized symbol decisions generated by each of the plurality of stages to generate the final symbol decision.

2. The method of claim 1, wherein the constellation associated with the transmitted signal is an effective constellation determined for the channel over which the transmitted signal is carried.

3. The method of claim 1, wherein the constellation associated with the transmitted signal corresponds to a constellation used to modulate the transmitted signal prior to transmission.

4. The method of claim 1, wherein the transmitted signal comprises a plurality of signal components transmitted from multiple antennas.

5. The method of claim 1, comprising selecting the subset of constellation points used by the last stage of the demodulator for determining the final symbol decision based on a localized symbol decision output by the stage immediately preceding the last stage, the localized symbol decision corresponding to one of the centroid-based values included in the set of centroid-based values input to or selected by the immediately preceding stage.

6. The method of claim 5, comprising determining the final symbol decision based on the received signal and the subset of constellation points selected for the last stage of the demodulator.

7. The method of claim 1, wherein determining a centroid-based value for each of the subsets of constellation points comprises determining a centroid for each of the subsets of constellation points.

8. A receiver, comprising:
a constellation processing module operable to group points of a constellation associated with a transmitted signal into a plurality of subsets, at least two adjacent ones of the subsets having one or more common constellation points so that the at least two adjacent subsets overlap, determine a centroid-based value for each of the subsets of constellation points and group the centroid-based values into one or more sets; and
a plurality of demodulation stages, each of the demodulation stages except for a last one of the demodulation stages being operable to localize a search for a final symbol decision using the set of centroid-based values input to or selected by the demodulation stage as constellation points to generate a localized symbol decision; wherein a first one of the demodulation stages is operable to demodulate a received signal using the set of centroid-based values input to the first demodulation stage to generate a first one of localized symbol decisions output by the first demodulation stage; and wherein the last demodulation stage generates a last one of the localized symbol decisions to determine the final symbol decision using the subset of constellation points input to or selected by the last demodulation stage; and
a summer operable to sum each of the localized symbol decisions generated by each of the plurality of stages to generate the final symbol decision.

9. The receiver of claim 8, wherein the constellation associated with the transmitted signal is an effective constellation determined for a channel over which the transmitted signal is carried.

10. The receiver of claim 8, wherein the constellation associated with the transmitted signal corresponds to a constellation used to modulate the transmitted signal prior to transmission.

11. The receiver of claim 8, wherein the transmitted signal comprises a plurality of signal components transmitted from multiple antennas.

12. The receiver of claim 8, wherein the last demodulation stage is operable to select the subset of constellation points for determining the final symbol decision based on a localized symbol decision output by the demodulation stage immediately preceding the last demodulation stage, the localized symbol decision corresponding to one of the centroid-based values included in the set of centroid-based values input to or selected by the immediately preceding demodulation stage.

13. The receiver of claim 8, wherein the last demodulation stage is operable to determine the final symbol decision based on a received signal and the subset of constellation points selected by the last demodulation stage.

UNITED STATES PATENT AND TRADEMARK OFFICE
CERTIFICATE OF CORRECTION

PATENT NO.       : 8,743,942 B2  
APPLICATION NO.  : 13/644602  
DATED            : June 3, 2014  
INVENTOR(S)      : Khayrallah Page 1 of 1

It is certified that error appears in the above-identified patent and that said Letters Patent is hereby corrected as shown below:

In the Specification

In Column 5, Line 66, delete "$r_k^{[1]} = r_k - \hat{r}'_k{}^{[1]}(5)$," and insert -- $r_k^{[1]} = r_k - \hat{r}'_k{}^{[1]} \qquad (5)$ --, therefor.

In Column 7, Line 67, in Equation (8), delete "$Q = \{2^L + 1, \ldots, -1, +1, \ldots, +2^L - 1\}$," and insert -- $Q = \{-2^L + 1, \cdots, -1, +1, \cdots, +2^L - 1\}$ --, therefor.

In Column 8, Line 3, delete "$\{2^{L-1} + 1, \ldots, +2^{L-1} - 1\},$" and insert -- $\{-2^{L-1} + 1, \cdots, +2^{L-1} - 1\},$ --, therefor.

Signed and Sealed this  
Twenty-third Day of September, 2014

Michelle K. Lee  
*Deputy Director of the United States Patent and Trademark Office*